United States Patent [19]

Geldbaugh

[11] Patent Number: 4,771,967
[45] Date of Patent: Sep. 20, 1988

[54] ROTOR AIRCRAFT

[76] Inventor: G. Richard Geldbaugh, 1848 Kahaki Dr. #1205, Honolulu, Hi. 96814

[21] Appl. No.: 887,050

[22] Filed: Jun. 17, 1986

[51] Int. Cl.⁴ ............................................. B64C 27/30
[52] U.S. Cl. ..................................... 244/7 R; 244/12.1; 244/17.11; 244/208
[58] Field of Search ................. 244/6, 7 R, 7 A, 12.1, 244/12.4, 26, 17.11, 17.23, 207, 208; 416/181

[56] References Cited

U.S. PATENT DOCUMENTS

| | | | |
|---|---|---|---|
| 2,327,145 | 8/1943 | Van Gieson | 244/26 |
| 2,611,554 | 9/1952 | Sanders | 244/6 |
| 2,753,132 | 7/1956 | Gley | 244/6 |
| 2,929,582 | 3/1960 | Munro | 244/207 |
| 2,946,540 | 7/1960 | Coanda | 244/207 |
| 3,179,353 | 4/1965 | Peterson | 244/12.3 |
| 3,397,852 | 8/1968 | Katzen | 244/12.3 |

FOREIGN PATENT DOCUMENTS 959441  3/1950  France .................................... 244/6

Primary Examiner—Galen Barefoot

[57] ABSTRACT

A rotorcraft is provided with laterally placed dual rotors which rotate in opposite directions with the axis through the center of the rotors being transverse to the longitudinal axis of the aircraft's fuselage. Between the two rotor hubs a wing structure is placed above and below the blades with the two wings joined together forming a leading edge outward of the blades' radius toward the designated front of the craft thus forming a sheltered wing structure that allows the two rotors to revolve in their retreating mode phase out of the air stream when the craft is in horizontal flight. A compressed gas ejection system would aid in the transition of the blades from operating in free air to operating within the sheltered wing structure. A louver system in the upper and lower wings would operate to allow air flow freely through the wing during the lifting or hovering mode. The entire assembly of the wing structure and the rotors can be maneuvered as a unit so that the flight characteristics would be similar to a helicopter.

6 Claims, 3 Drawing Sheets

ROTOR AIRCRAFT

BACKGROUND OF THE INVENTION

This invention relates to multi-rotor aircraft and more particularily to aircraft having laterally placed rotors transverse to the longitudinal axis of the aircraft.

Several prior patents, including U.S. Pat. Nos. H. H. Platt 2,414,766 Jan. 21, 1947, D. W. Main 2,389,798 Nov. 27, 1945, D. B. Linville 2,529,033 Nov. 7, 1950, A. M. Thompson 2,579,055 Dec. 1951, H. J. Bryan 3,409,248 Nov. 5, 1968 and foreign patents British #617,290 and #661,921 Cierva Autogiro Company Limited, French #637,938 and #1,330,233, Germany #721,878, #1,531,381, Austrian #203,876 and #231,656 disclose aircraft with laterally placed multi-rotor configurations.

All of the prior art aircraft have rotors which are directly connected to the fuselage or to wings rigidly connected to the fuselage. None of the prior patents appear to shelter the air stream from the rotor blades, use compressed gas as a transition medium, or provide for rotor movement means outside of the blade's diameter.

It is the intent of the present invention to provide a new and improved aircraft having a sheltered wing over a portion of the rotors that will allow the retreating mode of the rotor blades to rotate out of the air stream when the aircraft is in horizontal flight. A support and movement system that can structurally support and control some of the rotors' movement outward of the blades diameter as well as at a central location is another main objective.

Also a goal of the invention is to provide for a compressed gas ejection system which can aid the rotor blades in making the transition from operating in free air to operating within a structure.

Primarily because of the retreating blade characteristic, the speed of existing pure helicopters has been limited to about 200 knots since 1978. Also, because of the great complexity of the rotor assembly, tremendous stresses placed on the rotor blades, and the high vibration factors, the current rotor craft are extremely costly to maintain and have a high ratio of down time in relation to flight time.

The objects of the present invention are to provide an aircraft superior to existing rotor craft which can obtain higher flight speeds, be less complicated to construct, be more maintenance free and still have operation movements similar to a helicopter.

BRIEF DESCRIPTION OF THE INVENTION

In accordance with the present invention, there is provided an aircraft which includes dual rotors that are laterally placed with the axis through the center line of the rotors being transverse to the longitudinal axis of the craft's fuselage. The two blade system would rotate in opposite directions and could be placed close enough together so that the rotors would be synchronized to allow the blades to intermesh as they rotate.

Over the central areas between the two rotor hubs, where the rotor blades are in the retreating mode, a wing structure is placed above and below the blades. The two wings are joined together creating a leading edge outward of the blades' radius toward the designated front of the craft thus forming a sheltered wing structure.

The spaced apart wing structures are also joined together at the hubs of the rotors and by a vertical strut outward of the rotor radius to the rear of the craft. The perimeter shape of the lower and upper wing surfaces is sculpted so as to minimize the coverage over the blades, to minimize the weight and protect the blades from the air stream in the horizontal flight mode. The wing shape is also sculpted to aid in the transition of the rotor blades from a free air condition to a restricted area condition within the wing structure as the roots of the blades enter the shelter wing first.

As the front portion of the upper and lower wings are connected and form one leading wing edge to the air stream in horizontal flight, the air would be diverted over or under the wings' surfaces. The area between the upper and lower wing called the sheltered area would allow the two rotors to rotate in their retreating mode phase and be out of the air stream when the craft was in horizontal flight.

A louver system in the upper and lower wing would be arranged with air passages so that when the craft was in horizontal flight the high velocity air passing over the outer surface of the upper and lower wing would suction air out of the area sheltered between the wings. For the vertical lift and hovering mode the louver would open vertically to allow the air to flow freely through the wing.

At the front of the wing assembly where the two wing surfaces are joined to form one wing leading edge, the inside surfaces of the wing would be shaped to form an interior duct system which would collect air from the area between the wings and exit the air on the lower exterior surface of the wing. The air flowing off of the rotor blade tips would also be collected by the interior duct system as the blades pass through this section of the wing. The high velocity air passing by the exit of the duct system would suction air from the sheltered area between the wings.

The blades rotating rearward in their retreating mode, while in horizontal flight, would be operating in air which would offer a lesser resistance because of the suction caused by the air passing over the outer surfaces of the wing assembly and because they are not in direct contact with the air stream.

The power train for the craft would be of conventional means and function in the following manner. From a power source energy would be conveyed to a shaft which would convey the energy to a transmission. From the transmission the energy would be conveyed to a vertical drive shaft which would have universal joints and adjustable length means. From the vertical drive shaft the energy would be conveyed by a gearing means which transfers the energy to a horizontal wing drive shaft which would convey the energy to a gearing means to drive the rotors. The originating power source could be single or multiple units.

A compressor of conventional means would be driven by the power source and distribution lines would deliver the compressed gas from the compressor to ejectors in the wing structure. High pressure gas from the exhaust of turbine engine could also be utilized for the compressed gas function. The compressed gas would be ejected in determined patterns to aid the rotor blades in the transition from operating in free air to operating in a restricted space between the wings. The compressed gas would be ejected into the path of the rotor blades as they approach the wing structure and the air cushion would overcome the abruptness of the change in conditions that the blades would encounter as they entered the wing structure. Also the compressed gas could also be ejected within the structure to reduce the retreating blades' tip angle of attack.

The movement of the wing assembly so that the aircraft would function like a helicopter would be as follows:

The sheltered wing structure and the rotor assemblies would act as one unit which is called the "wing rotor".

The vertical movement means for controlling the raising and lowering of the front of "wing rotor" would be located in the fuselage directly behind the cockpit area and would attach to a central location on the leading edge of the "wing rotor". The connection from the "wing rotor" to the vertical movement means would be by a universal joint which would also allow for a range of motion. The vertical movement means would cause the "wing rotor" to move in a arced glide track vertically to desired positions. The vertical arced glide track would have the ability to move horizontally in a horizontal glide system. A horizontal movement means would move the vertical arced glide track to the desired horizontal position.

Therefore by the vertical and horizontal movement means the front of the "wing rotor" can be raised or lowered vertically and moved laterally to the right or left of the longitudinal axis.

At the junction of the longitudinal axis of the craft and the transverse axis which passes through the rotors the vertical drive shaft from the transmission would be located.

The lateral pivot movement means would be positioned immediately to the right and to the left of the vertical drive shaft along the transverse axis.

The lateral pivot movement means would secure the "wing rotor" to the fuselage at this central location. The top of the lateral pivot movement means which connects to the "wing rotor" would be a universal connection which would allow the wing unit to rotate around the transverse axis.

The bottom of the lateral pivot movement means would be secure to base disc that could turn so that alignment between the vertical arced glide tract in the front of the fuselag and the lateral pivot movement means would remain as the arced glide track is moved to the right or left of the longitudinal axis. The base disc would be secured to the fuselage through a bearing means which allows turning. Through the center of the disc an opening would occur through which the vertical drive shaft would pass.

The lateral pivot movement means causes the lateral pivot motion to either side of the vertical axis which, coupled with the vertical and horizontal movement means, makes possible the complete range of motion of the "wing rotor".

The aircraft would function in the following manner:

For lifting and hovering modes the louver system of the shelter wing would be opened to allow air to freely pass through the wing.

The rotor blades would have their angle of attack increased to provide maximum lift.

The "wing rotor" would be manipulated to control the flight characteristics by the vertical movement means, horizontal movement means, and the lateral pivot movement means.

For the transition to horizontal flight the thrust from the gas turbine to the rear of the craft would be increased causing the air stream to pass over the leading edge of the "wing rotor." With horizontal flight initiated the louver system would gradually close and the blades of the rotors would be feathered so that they rotate as wing air foils with minimum angle of attack. The thrust from the gas turbine engines would be increased and would become the prime motivating force for the horizontal flight.

While in horizontal flight the craft would be negotiated by the movement of the "wing rotor", much the same as a helicopter.

The concept would be basically the same, only in opposite sequences, for transition from horizontal flight to a hovering, lifting mode.

DETAILED DESCRIPTION OF THE INVENTION

Figure 1:
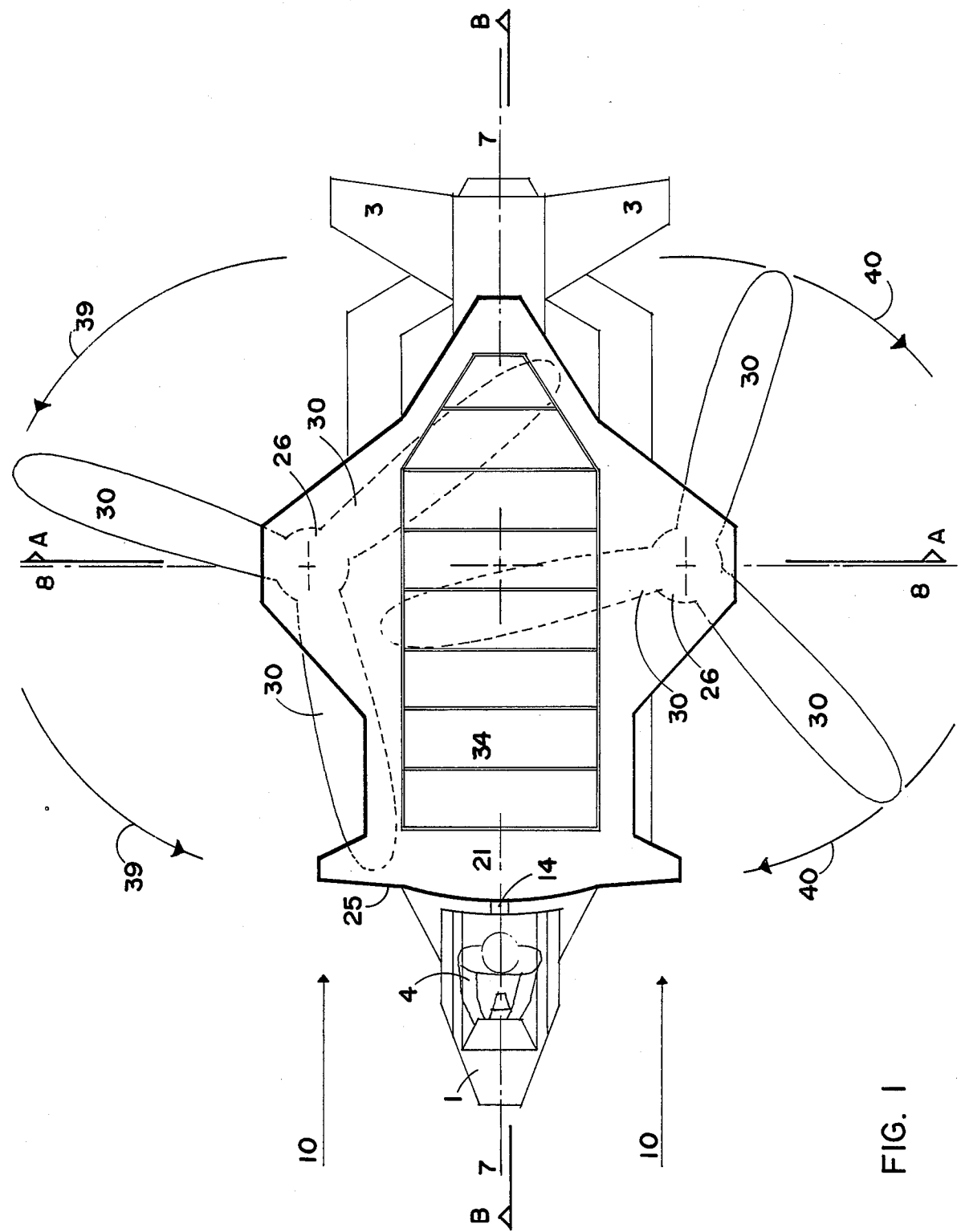
FIG. 1: Top view of aircraft showing the rotors with dashed lines where the blades are in the sheltered portion of the wing.
Figure 2:
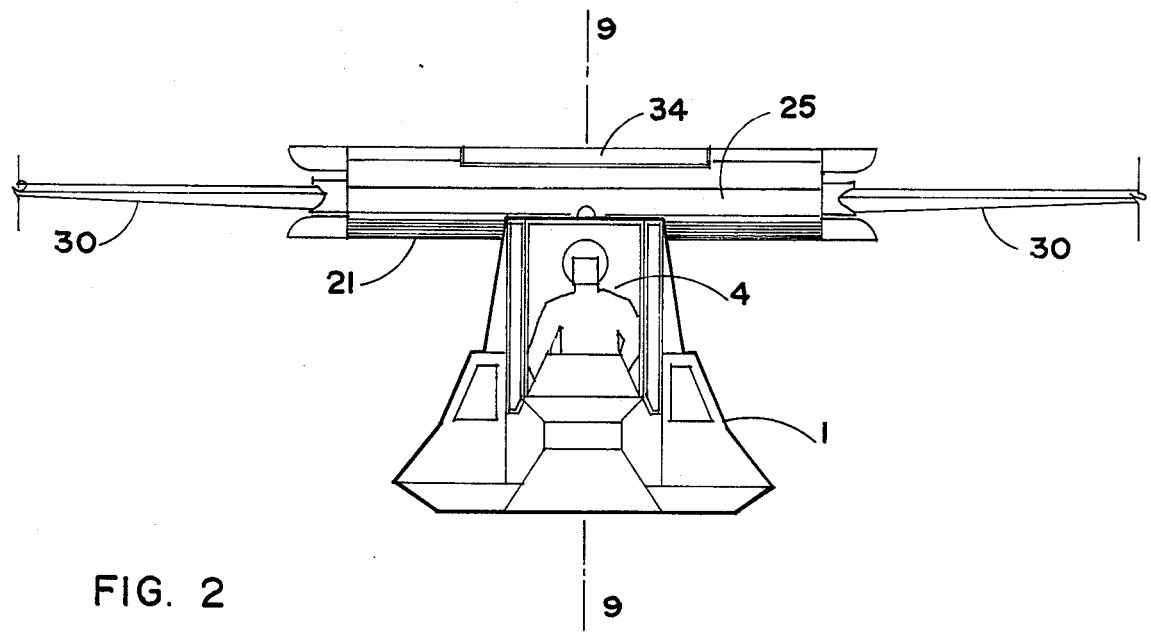
FIG. 2: Front view of the aircraft.

Referring now more specifically to the drawings, FIGS. 1 through 6 show a one man sheltered rotor aircraft. The illustrated one man aircraft is described for purposes of illustration only, and it should be recognized that the advantages inherent in the present invention are equally applicable to aircraft of other sizes and having different configurations and uses.

The aircraft includes a fuselage 1 and a sheltered wing rotor assembly 21. The fuselage 1 includes a cockpit 4, landing gear 6, energy source 2, transmission 5 and gas compressor means 11. Also included as part of the fuselage is the vertical movement means 12, the horizontal movement means 13, and the tail wings 3.

The sheltered wing rotor assembly 21 is articulately attached to the fuselage 1 (see FIG. 3) by the lateral pivot 19 refers to lateral pivot means—activators could be termed lateral pivot means (see FIG. 4) by the universal joint 14 to the vertical movement means 12 which is connected to the horizontal guides 15 that are connected to the fuselage 1.

The vertical drive shaft 16 from the transmission 5 which is housed in the fuselage 1 connects to the wing horizontal drive shaft 22 through universal joints 23 and gearing and bearing means 24.

Figure 6:
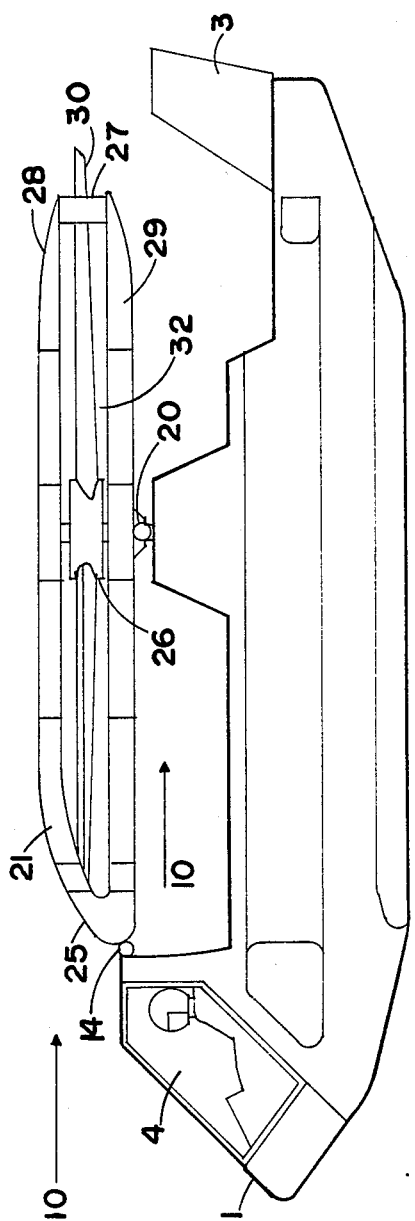
FIG. 6: Side view of the aircraft.

The sheltered wing rotor assembly 21 includes an upper wing structure 28 and a lower wing structure 29 as shown in FIG. 6. The wing structures are jointed together at the front to form one leading edge 25.

The wing structures are also joined together at the rotor hubs 26 and at the rear wing strut 27. The wing configuration forms a sheltered area 32 in which the blades of the rotor 30 can rotate out of the airstream 10 when the craft is in horizontal flight. The perimeter shape of the upper wing structure 28 and the lower wing structure 29 are formed to minimize to the coverage over the rotor blades 30 and reduce the weight of the wing structure as can be seen in FIG. 1. The shape of the wing structure has the roots of the blades 30 entering into the area between the wing structures first so as to facilitate the transition of loading effects on the blades gradually from the blade roots outward.

The interior surface of the wing structure would be shaped at the front of the wing to form a wing duct system 31 (see FIGS. 4 and 5) which would collect air from the sheltered portion of the wing and off of the rotor blade 30 tips and exit the air by an airway 33 to the lower exterior surface of the wing. The high velocity air from the air stream 10 passing by the airway 33 would suction air from the sheltered area 32 when the craft was in horizontal flight.

In the wing upper structure 28 and the wing lower structure 29 operating louver systems 34 would occur. The louvers would be able to pivot by operating means to a open position (see FIG. 4) which would allow the air to freely flow through the wing structure. The open louvers position would be utilized in the lifting or hovering mode of flight.

When the louver systems 34 are in the closed position small airways 33 between the louvers would be formed which would allow air passage from the sheltered area 32 to exit in the exterior surfaces of the wing structure. The high velocity air of the air stream 10 flowing by the airways 33 would suction air from the sheltered area 32 when the craft is in horizontal flight.

As an alternative the louver system could also be designed to slide in relation to one another to provide for the free air passage rather than the hinge pivot system.

Figure 5:
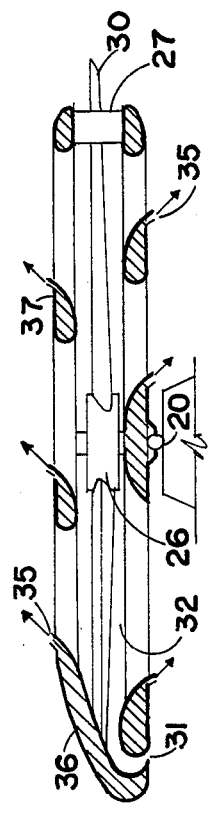
FIG. 5: Longitudinal section of "wing rotor" showing airstream diverter, leading edge and diverter wing sections.

As the main purpose of the sheltered wing is to protect the retreating blades of the rotors from the air stream 10, it may be desired as an alternative to have a deflecting leading edge wing section 36 and other air stream diverter wing sections 37 spaced apart toward the rear forming the area to be sheltered, rather than a continuous wing structure which has louvers (see FIG. 5). In order to have the space between the wing sections be as wide as possible, a compressed gas ejection system 35 would be ejected from the trailing edges of the wing section and panels to further divert the air stream 10.

The entire rotor assembly and sheltered wing structure called the "wing rotor" 21 would act as one unit. The vertical movement of the front wing rotor 21 would be by the vertical movement means 12. An arched vertical glide track 17 would be connected to horizontal glides that then would be mounted to the fuselage 1. Within the vertical glide track 17 a vertical movement means 12 would move the front of the wing rotor 21 assembly vertically. The horizontal movement mean 13 would move the vertical glide track 17 in the horizontal glides 15 which would give the front of the wing rotor 21 movement to either side of the fuselage's longitudinal axis 7 (see FIG. 4).

Figure 3:
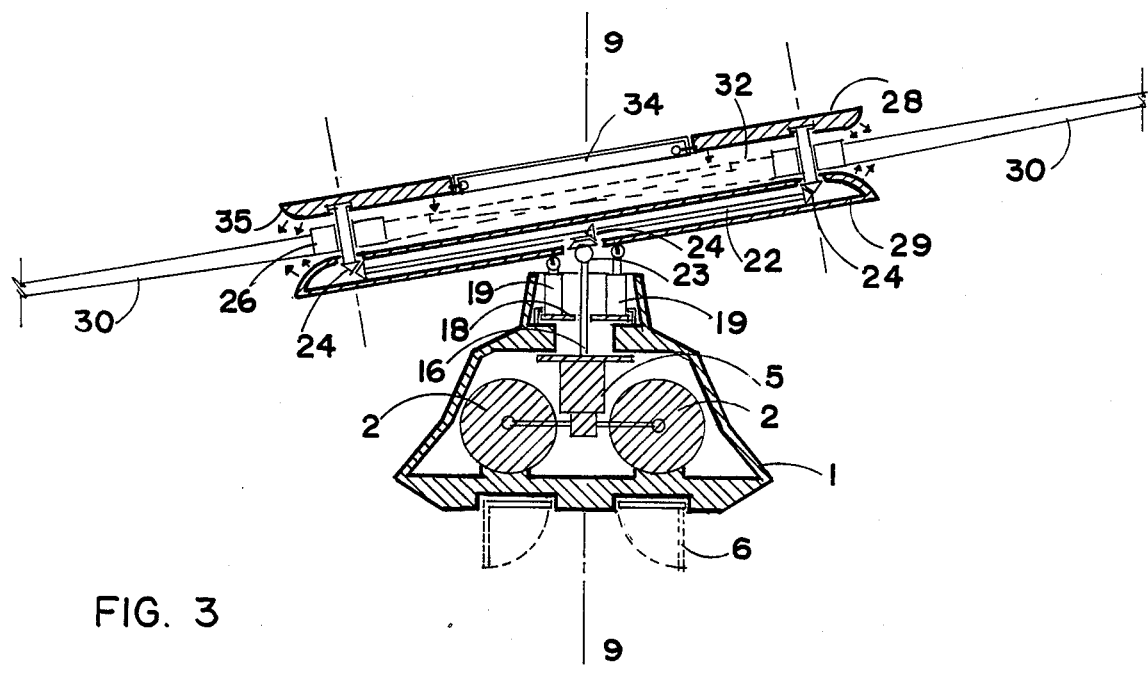
FIG. 3: Transverse section of the aircraft (Section A—A).

For the lateral pivot of the wing rotor assembly 21 to either side of the vertical axis 9, the lateral pivot movement means 19 is utilized (see FIG. 3). These movement control devices are located along the transverse axis 8 which pass through the center of the rotor hubs on either side of the junction with the longitudinal axis 7. The top of the lateral movement means 19 is connected by a universal articulation means 20 to the wing rotor assembly 21. The bottom of the lateral movement means 19 is connected to a base disc 18 that is then secured through a bearing means to the fuselage 1. There is an opening in the center of the base disc 18 through which passes the vertical drive shaft 16. The base disc 18 can turn so that the front of the "wing rotor" 21 can be moved horizontal to the right or left of the fuselage's longitudinal axis 7. The lateral pivot movement means 19 provides for the lateral pivoting of the "wing rotor" 21 to either side of the vertical axis 9 combined with the vertical movement means 12, and the horizontal movement means 13, gives the aircraft the ability to operate much like existing helicopters.

The dual rotors will be operating in opposite directions and if the systems are located close together they would be synchronized so their blades would intermesh as they turn. Because of their rotation in opposite directions, a tail rotor or other anti-torque mechanism would not be necessary which would result in a savings of energy which could be used by the main propulsion system.

In order to aid the rotor blades 30 in the transition from operating in free air to approaching and entering a structure with restricted air, a wing compressed gas system 35 would eject air in designated patterns at the perimeter of the rotor wing 21 and within the sheltered area 32. The compressed gas would be obtained from a compressor means 11 which would be driven by the gas turbines 2. The compressed gas would be delivered to the ejector by distribution lines and the gas would be exited in designated patterns in and about the wing rotor 21 assembly. Exhaust gas from the turbines could also be utilized in the wing compressed gas system 35.

Figure 4:
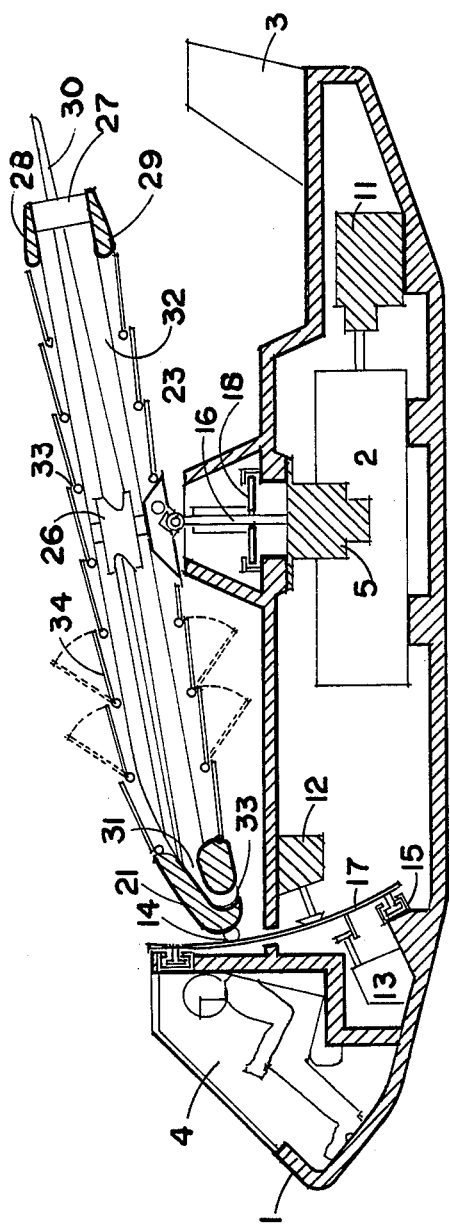
FIG. 4: Longitudinal section of the aircraft (Section B—B).

From gas turbine engines 2 located in the fuselage 1 the energy generated would drive a shaft which would deliver the power to a transmission 5 which would then deliver the power to a vertical drive shaft 14 (see FIG. 3 and 4). The power through universal joints 23 and gearing and bearing means 24 would be delivered to the wing horizontal drive shaft 22 which then would convey the energy through gearing and bearing means 24 to the rotor hubs 26.

The gas turbines 2 would have the ability to drive the rotors and the gas compressor and be able to provide the thrust for horizontal flight. Although gas turbines are named as the preferred energy source, other engines could be utilized and the aircraft could be powered by a single engine source or multi engines.

As the rotor blades 30 are relatively short, they could turn at higher speeds and could also be of fairly rigid construction, thus reducing the demands on the transmission 5 and reducing its size and weight. As a power train alternative the energy from the gas turbines could be delivered to a compressor which would force high pressure air through ducts to drive the rotors. The amount of lead-lag and twist characteristics of the blades would be developed along with the compressed gas ejector system 35 and the wing structure effects. The rotor hubs 26 would have a feathering means to change the rotor blades' 30 angle of attack.

In operation the power from the gas turbines 2 would be delivered to the rotor hubs 26. For the lifting and hovering modes the wing louver systems 34 would be opened (see FIG. 4) and the rotor blades 30 would have their angle of attack increased by the blade feathering means.

In the transition from hovering to horizontal flight thrust from the gas turbines to the rear of the craft would be increased causing the air stream to pass over the leading edge of the wind rotor.

The "wing rotor" 21 assembly would be maneuvered for stability flight control similar to the helicopter operation during the hovering and transition flight modes.

As more horizontal speed is achieved the rotor blades 30 would be feathered to a minimal angle of attack and the louver system 34 would gradually close and the thrust from the gas turbines 2 to the rear of the aircraft would be increased.

The movement of the wing rotor assembly 21 would provide the control to negotiate the aircraft while in horizontal flight.

The transition from horizontal flight to the hovering and lifting mode would basically involve reducing the air speed, gradually increasing the angle of attack of the blades while the louvers are simultaniously opening. The aircraft would then be prepared to descend.

In high speed horizontal flight the rotor blades 30 would be feathered so that the blades act like rotating wing air foils. As the blades will have basically no angle of attack they will rotate through the shelter portion of the wing structure with less resistance. The thrust from the gas turbines 2 will provide the forward propulsion for the high speed horizontal flight.

The configuration affords an aircraft in which the wing rotor assembly 21 can act like a wing for high speed horizontal flight and be highly maneuvered to make possible intricate handling at low speeds, similar to a helicopter.

These together with other objects and advantages which will become subsequently apparent reside in the details of construction and operation as more fully hereinafter described and claimed, reference being had to the accompanying drawings forming a part hereof, wherein like numerals refer to like parts throughout.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An aircraft for vertical, horizontal or stationary flight comprised of a moveable wing member-rotor composite and a fuselage member to which said wing member-rotor composite is articulately attached, said fuselage member includes propulsion means, aerodynamically active flight control means and means for operating said propulsion and flight control means, as well as gas compressor means, said wing-rotor composite includes dual laterally placed rotors that revolve in opposite directions, said wing member has an upper and lower wing structure joined together to create a front leading edge which forms a shape providing a sheltered area between the wing surfaces in which the rotor blades can rotate in their retreating mode out of the air stream flowing over the front of the aircraft, said wing member also has a compressed gas ejection system which alters the atmospheric air's characteristics as it relates to the rotating blades when the blades are approaching, entering or are within the sheltered area, said wing member-rotor composite act as one unit so that the entire assembly can be moved in a range of motion relative to the fuselage allowing the front of the wing member rotor assembly to move vertically and horizontally and also allows the assembly an arced motion around the fuselage's longitudinal axis, said wing member has an operating louver system which, when open, allows the air to freely pass through the upper and lower wing structure and when in the closed position, the louvers form airways which allow high velocity air moving over the exterior surfaces of the wing to suction air out of the sheltered area, said wing member also has a collecting duct system in the interior portion of the wing's leading edge which collects air from the rotor blade tips and from the sheltered area and exits air to the wing exterior surface where high velocity air passing by the duct exits cause a suction on the air from the sheltered area.

2. An aircraft as previously set forth in claim 1 wherein the wing member is formed to have a front leading edge to deflect the air stream and has in a rearward direction spaced apart air diverting wing sections that are configured to form a sheltered area in which the rotor blades rotate out of the air stream when the aircraft has forward movement.

3. An aircraft as previously set forth in claim 2 wherein said compressed gas ejector system ejects compressed gas in designated patterns to alter the atmospheric air's characteristics around the rotor blades as the blades approach, enter or are within the wing structure, said compressed gas system shall also be used to divert the air stream flowing over the front of the aircraft away from the rotor blades in designated patterns.

4. An aircraft as specified in claim 1 wherein said wing-rotor assembly is connected to the fuselage by a articulated movement means at a central position.

5. An aircraft as specified in claim 4 wherein the wing rotor assembly shall also be connected to the fuselage outward of the rotor's diameter by an articulation movement means providing a wide range of motion and changes of the wing-rotor assemblies position relative to the fuselage.

6. An aircraft as specified in claim 4 wherein the wing rotor assembly through the lateral pivot means does connect to a revolving base disc which is secured through bearing means to the fuselage and that said base disc enabling the front of the wing-rotor assembly to revolve laterally to either side of the longitudinal axis.

* * * * *